United States Patent
Jamthe (10) Patent No.: US 10,262,333 B2
(45) Date of Patent: Apr. 16, 2019

(54) LINEAR PROGRAMMING APPROACH FOR QUERYING A TRIE DATA STRUCTURE

(71) Applicant: InMobi PTE LTD, Singapore (SG)

(72) Inventor: Swapnil Suresh Jamthe, Bangalore (IN)

(73) Assignee: INMOBI PTE. LTD., Singapore (SG)

( * ) Notice: Subject to any disclaimer, the term of this patent is extended or adjusted under 35 U.S.C. 154(b) by 471 days.

(21) Appl. No.: 14/821,269

(22) Filed: Aug. 7, 2015

(65) Prior Publication Data

US 2016/0042384 A1 Feb. 11, 2016

(30) Foreign Application Priority Data

Aug. 7, 2014 (IN) .......................... 3870/CHE/2014

(51) Int. Cl.
| | |
|---|---|
| *G06F 17/00* | (2006.01) |
| *G06F 17/30* | (2006.01) |
| *G06Q 30/02* | (2012.01) |

(52) U.S. Cl.
CPC .............................. *G06Q 30/0241* (2013.01)

(58) Field of Classification Search
CPC ......... G06F 17/30327; G06F 17/30386; G06F 17/30424
See application file for complete search history.

(56) References Cited

U.S. PATENT DOCUMENTS

| | | |
|---|---|---|
| 8,521,487 B2 | 8/2013 | Fijany et al. |
| 2009/0119237 A1* | 5/2009 | Triantafillidis ....... H04L 47/823 706/19 |
| 2011/0170416 A1 | 7/2011 | Schwager et al. |
| 2013/0173520 A1 | 7/2013 | Clemencom et al. |

OTHER PUBLICATIONS

Jianbin Qin, Xiaoling Zhou, Wei Wang, Chuan Xiao, "Trie-Based Similarity Search and Join", ACM, Mar. 18-22, 2013, pp. 392-396.*
Srinath Sridhar, Fumei Lam, Guy E. Blelloch, R. Ravi, and Russell Schwartz, "Mixed Integer Linear Programming for Maximum-Parsimony Phylogeny Inference", IEEE/ACM Transactions on Computational Biology and Bioinformatics, vol. 5, No. 3, Jul.-Sep. 2008, pp. 323-331.*
Christoph Koch, "Processing Queries on Tree-Structured Data Efficiently", ACM, PODS'06, Jun. 26-28, 2006, pp. 213-224.*

(Continued)

*Primary Examiner* — Cheryl Lewis (57) ABSTRACT

The present invention provides a method and system for querying a trie data structure. The method and system include constructing a pool of linear programming problems for a trie data structure, storing the pool of linear programming problems in a memory, receiving a request, setting variables in one linear programming problem to unity, sending the one linear programming problem to a solver, wherein the solver sets a p variable corresponding to each path to 0 or 1, iterating through p variables corresponding to one or more paths, considering at most n paths, selecting one path from the n paths, assigning same values as that of one or more variables of the unknown value type nodes that are present in the selected one path, and resetting variables in the one linear programming problem to zero that was previously set to unity.

20 Claims, 5 Drawing Sheets

(56) References Cited

OTHER PUBLICATIONS

Trofimov, Ilya; Anna Kornetova and Valery Topinskiy; Using Boosted Trees for Click-through Rate Prediction for Sponsored Search; Proceedings of the Sixth International Workshop on Data Mining for Online Advertising and Internet Economy, Beijing, China, Aug. 12-16, 2012, pp. 1-6, ACM, New York, New York.

Kolaitis, Phokion G.; Enela Pema; and Wang-Chiew Tan; Efficient Querying of Inconsistent Databases with Binary Integer Programming; Proceedings of the Very Large Database Endowment, Apr. 2013, vol. 6, Iss. 6, pp. 397-408, ACM.

\* cited by examiner

LINEAR PROGRAMMING APPROACH FOR QUERYING A TRIE DATA STRUCTURE

FIELD OF THE INVENTION

The present invention relates to querying a trie data structure and in particular, it relates to predicting click-through rates of advertisements by querying the trie data structure.

BACKGROUND OF THE INVENTION

Predicting advertisement click-through rates (CTR) is a massive-scale learning problem. Traditionally click-through rates were predicted by continuous supervision based on an Follow The (Proximally) Regularized Leader (FTRL-Proximal) online learning algorithm and the use of per-coordinates learning rates.

Online advertising is a multi-billion dollar industry that has served as one of the great success stories for machine learning. Sponsored search advertising, contextual advertising, and real-time bidding auctions have all relied heavily on the ability of learned models to predict click-through rates of advertisements accurately, quickly, and reliably.

In practice, predicting click-through rates may be relatively easy to determine for advertisements that have been previously displayed in online auctions, especially for those advertisements that have been displayed many times and consequently have substantial click history which may be collected. However, where there may be minimal click history for advertisements predicting click-through rates may be difficult to accurately estimate. Moreover, for new advertisements, predicting click-through rates may be unknown to the online system. Accordingly, an online system must somehow predict the click-through rates for advertisements with minimal or no click history. It is a challenge to accurately predict click-through rates for such advertisements that would allow a search engine to display the most relevant advertisements and to price them correctly in an online auction. Given the large scale of search engine traffic, small errors in finding this probability can result in much lost revenue and in an adverse user experience.

In general, click-through rates are predicted by querying nodes of trie data structures. Trie data structures are tree data structures for storing a set of strings. A trie data structure turns a string set into a digital search tree. Several operations may be supported using the data structure, such as mapping the strings to integers, retrieving a string from the hie data structure, performing prefix searches and many others. The trie data structure comprises one or more known value type nodes and one or more unknown value type nodes.

Currently the combinations of unknown value type nodes are considered. For each combination the system queries the trie data structure along with the values of known value type nodes and consider the combination that has maximum value for the path in the trie data structure. But, this approach has many disadvantages like for each combination of unknown value type nodes the system queries the trie data structure to get its associated value, the best solution may be limited to the sampled combinations as it may not be practical to traverse the trie data structure for all the combinations, for same considered path in the trie data structure the system may traverse the trie data structure multiple times for different sampled combinations getting the same value, the system needs to maintain combinations of unknown value type nodes.

In light of the above discussion, there is a need for a method and system, which overcomes all the above stated problems.

BRIEF DESCRIPTION OF THE INVENTION

The above-mentioned shortcomings, disadvantages and problems are addressed herein which will be understood by reading and understanding the following specification.

In various embodiments, the present invention provides a method for querying a trie data structure. The method includes constructing a pool of linear programming problems for a trie data structure, storing the pool of linear programming problems in a memory, receiving a request, wherein the request comprises one or more values for the one or more known value type nodes, setting variables in one linear programming problem to unity, wherein the variables correspond to one or more values received in the request, sending the one linear programming problem to a solver, wherein the solver sets a p variable corresponding to each path to 0 or 1, iterating through p variables corresponding to one or more paths, considering at most n paths, selecting one path from the n paths, assigning same values as that of one or more variables of the unknown value type nodes that are present in the selected one path, and resetting variables in the one linear programming problem to zero that was previously set to unity.

In another aspect, the present invention provides a system for querying the trie data structure. The system includes a building module, a storage module, a receiving module, a configuration module, a transmitting module, an iteration module, an identification module, a selection module, an assignment module and a resetting module. The building module is configured to construct the pool of linear programming problems for the trie data structure. The storage module is configured to store the pool of linear programming problems in the memory. The receiving module is configured to receive the request. The configuration module is configured to set variables in the one linear programming problem to unity. The transmitting module is configured to send the one linear programming problem to the solver, wherein the solver sets a p variable corresponding to each path to 0 or 1. The iteration module is configured to iterate through p variables corresponding to the one or more paths. The identification module is configured to consider at most n paths. The selection module is configured to select one path from the n paths. The assignment module is configured to assign same values as that of one or more variables of the unknown value type nodes that are present in the selected one path. The resetting module is configured to reset the variables in the one linear programming problem to zero.

Systems and methods of varying scope are described herein. In addition to the aspects and advantages described in this summary, further aspects and advantages will become apparent by reference to the drawings and with reference to the detailed description that follows.

BRIEF DESCRIPTION OF THE DRAWINGS

FIGS. 4A and 4B are collectively referred to as "FIG. 4".

DETAILED DESCRIPTION OF THE INVENTION

In the following detailed description, reference is made to the accompanying drawings that form a part hereof and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
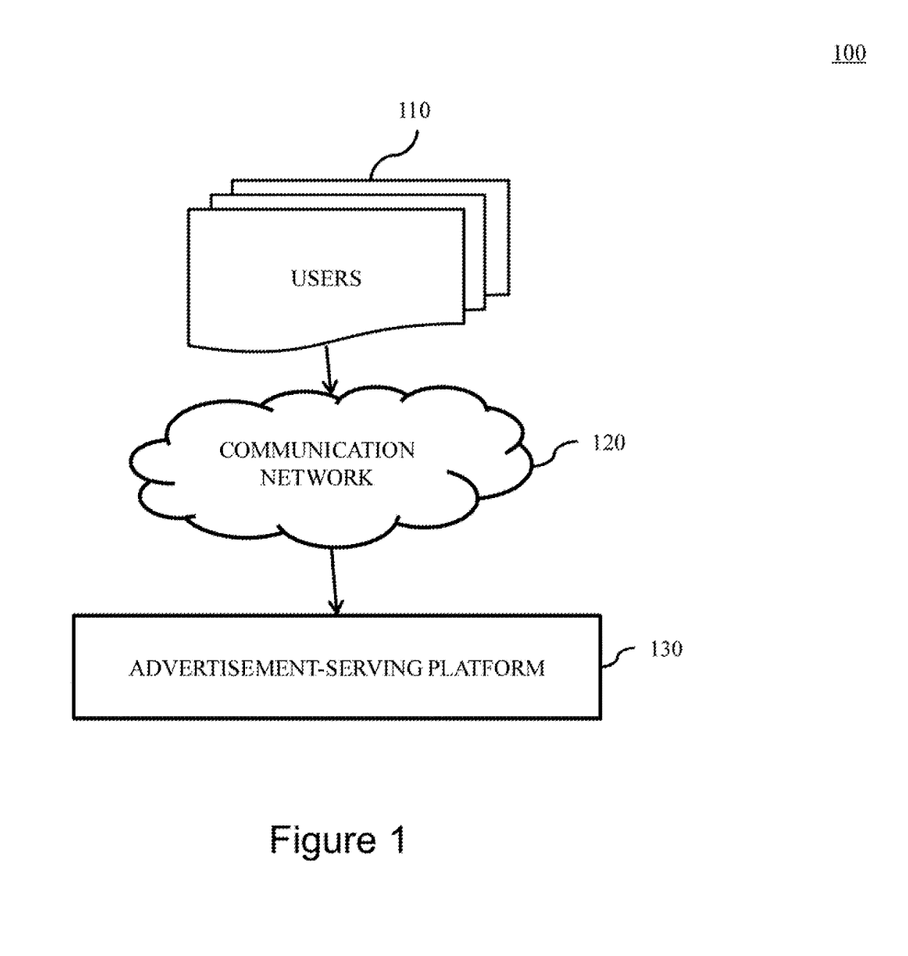
FIG. 1 illustrates a system for querying a trie data structure, in accordance with embodiments of the present invention.

FIG. 1 illustrates a system 100 for querying a trie data structure (not shown in the figure), in accordance with various embodiments of the present invention. The system 100 includes a plurality of users 110, a communication network 120, and an advertisement-serving platform 130.

In context of the present invention, the plurality of users 110 refers to any person, agency or entity that desires to receive multimedia content to be added to its current website. In an embodiment, the plurality of users 110 refers to the owner or creator of the web content. In another embodiment, the plurality of users 110 can be a publisher (entity including persons, organizations, and/or computer systems) responsible for creating and/or maintaining a content item on any of the content servers.

In context of the present invention, the communication network 120 refers to any device that allows several users to communicate with the advertisement-serving platform 130. Examples of the communication network are, but may not be limited to a local area network, a wide area network, a wireless network, a telecommunication network. Types of the telecommunication network are, but may not be limited to a global system for mobile communication (GSM) network, a general packet radio service (GPRS) network, a code division multiple access (CDMA) system, an enhanced data GSM environment (EDGE), a wideband CDMA (WCDMA).

In context of the present invention, the advertisement-serving platform 130 refers to a computing platform that enables advertisers to manage, deliver and display advertising content in publisher's online site. Examples of advertisement-serving platform 130 can be Google Adsense®, Yahoo! Panama™, InMobi®, and the like.

A user communicates with the advertisement-serving platform 130 via the communication network 120. The common functionalities of the advertisement-serving platform 130 are trafficking advertisements according to differing business rules, targeting advertisements to different end users, tuning and optimizing based on results obtained, reporting impressions, predicting click-through rates, post-clicks to generate revenue module and the like. The advanced functionalities of the advertisement-serving platform 130 include customizing advertisements according to the changing trends, frequency capping, sequencing advertisements and the like. For simplicity of explanation the system disclosed herein is described with respect to a single user. However, skilled artisans shall appreciate that the invention applies as well to the plurality of users 110.

Figure 2:
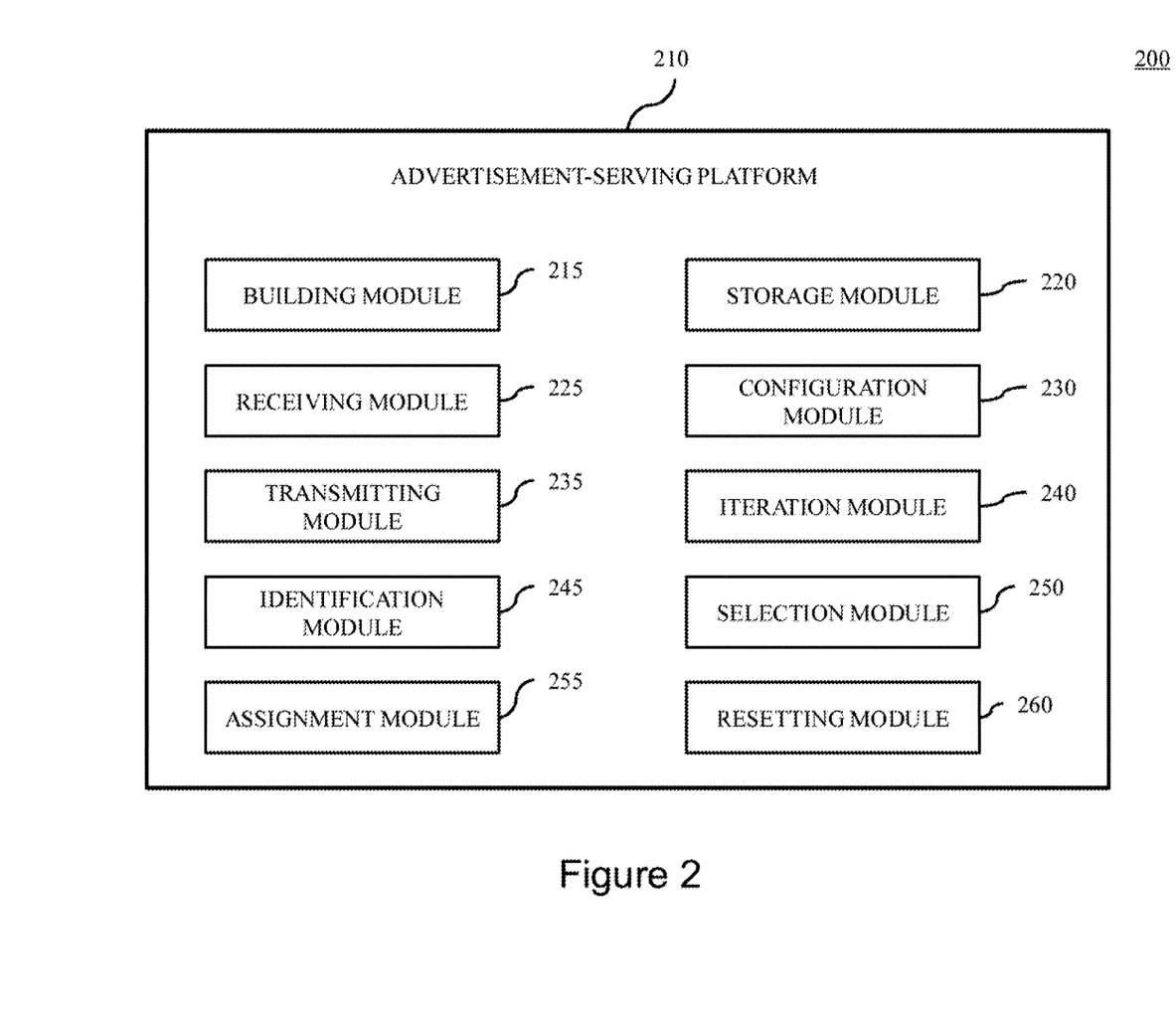
FIG. 2 illustrates a block diagram of a advertisement-serving platform, in accordance with embodiments of the present invention.

FIG. 2 illustrates a block diagram 200 of the advertisement-serving platform 210, in accordance with various embodiments of the present invention. The advertisement-serving platform 210 includes a building module 215, a storage module 220, a receiving module 225, a configuration module 230, a transmitting module 235, an iteration module 240, an identification module 245, a selection module 250, an assignment module 255, and a resetting module 260.

The building module 215 of the advertisement-serving platform 210 constructs a pool of linear programming problems for the trie data structure (not shown in the FIG. 2). The term used herein "the pool of linear programming problems" refers to optimization problems where the objective function and the constraints are all linear. The pool of linear programming problems includes similar type of linear programming problems. Further, each linear programming problem in the pool of linear programming problems includes an objective function and at least one constraint relationship. The term used herein "the objective function" refers to a function that maximizes or minimizes some numerical value. The objective function indicates how much each variable contributes to the value to be optimized in each linear programming problem. The objective function takes the following general form:
maximize or minimize $$Z = \sum_{i=1}^{n} c_i X_i$$

Where
$c_i$=the objective function coefficient corresponding to the $i^{th}$ variable, and
$X_i$=the $i^{th}$ decision variable.

The coefficients of the objective function indicate the contribution to the value of the objective function of one unit of the corresponding variable. For example, if the objective function is to maximize the present value of a project, and $X_i$ is the $i^{th}$ possible activity in the project, then $c_i$ (the objective function coefficient corresponding to $X_i$) gives the net present value generated by one unit of activity i. As another example, if the problem is to minimize the cost of achieving some goal, $X_i$ might be the amount of resource i used in achieving the goal. In this case, $c_i$ would be the cost of using one unit of resource i.

The trie data structure includes one or more paths. Each path of the one or more paths includes one or more known value type nodes and one or more unknown value type nodes. The each path of the trie data structure is associated with a path value. Each known value type node and each unknown value type node have same type of children.

Further, the building module 215 of the advertisement-serving platform 210 constructs the pool of linear programming problems for the trie data structure at regular intervals at the back end.

The storage module 220 of the advertisement-serving platform 210 stores the pool of linear programming problems in a memory. Further, the storage module 220 stores one or more types of information. The one or more types of information stored in the storage module 220 includes, but may not be limited to information about the plurality of users 110, information about advertisements, information about publishers, advertisement access control table, charging list information, fees calculating information, geographic locations, advertising zones, point of interest data, and optical criteria.

The receiving module 225 of the advertisement-serving platform 210 receives a request. In an embodiment, the receiving module 225 receives the request from the user of the plurality of users 110. In another embodiment, the receiving module 225 receives the request from a mobile application. In yet another embodiment, the receiving module 225 receives the request from a mobile website. The request includes one or more values for the one or more known value type nodes. The pool of linear programming problems is used to serve multiple requests received from the plurality of users 110 concurrently. The receiving module 225 picks one linear programming problem from the pool of linear programming problems at the time of receiving the request. The pool of linear programming problems includes similar types of linear programming problems.

The configuration module 230 of the advertisement-serving platform 210 sets the variables in one linear programming problem to unity. The configuration module 230 sets the variables in the one linear programming problems that correspond to the one or more values received in the request.

The transmitting module 235 of the advertisement-serving platform 210 sends the one linear programming problem to a solver. The term used herein "the solver" refers to mathematical software in the form of stand-alone computer software or a software library that solves a mathematical problem. The solver takes the problem description in generic form and calculates the solution. Further, the solver calculates the solution by considering the variables corresponding to the each known value type node as constants and by setting a p variable corresponding to each path to 0 or 1.

The iteration module 240 of the advertisement-serving platform 210 iterates through all the p variables. Each p variable corresponds to each path of the one or more paths.

The identification module 245 of the advertisement-serving platform 210 considers at most n paths. The at most n paths are considered based on the value of each p variable. The value of the each p variable is set to 0 or 1 by the solver. The identification module 245 considers at most n paths that have its p variable set to 0.

The selection module 250 of the advertisement-serving platform 210 selects one path from the at most n paths. The selection module 250 selects the one path based on the weighted random method.

The assignment module 255 of the advertisement-serving platform 210 assigns same values as that of one or more variables of the unknown value type nodes that are present in the selected one path. For example, consider A, B and C as known value type nodes and X, Y and Z as unknown value type nodes. The selection module 250 selects one path, for example a1, b1, x1, z1 from the at most n paths using weighted random method. In this example, the selected one path includes unknown value type nodes X and Z. Hence, the assignment module 255 assigns X=x1 and Z=z1.

Further, the assignment module 255 assigns a random value to one or more variables of the unknown value type nodes that are not present in the selected one path. For example, the unknown value type node Y is not present in the selected one path. Hence, the assignment module assigns a random value to the unknown value type node Y.

The resetting module 260 of the advertisement-serving platform 210 resets the variables in the one linear programming problem to zero. The resetting module 260 resets those variables in the one linear programming problem that were previously set to unity by the configuration module 230.

Further, the resetting module 260 puts back the one linear programming problem into the pool of linear programming problems.

Figure 3:
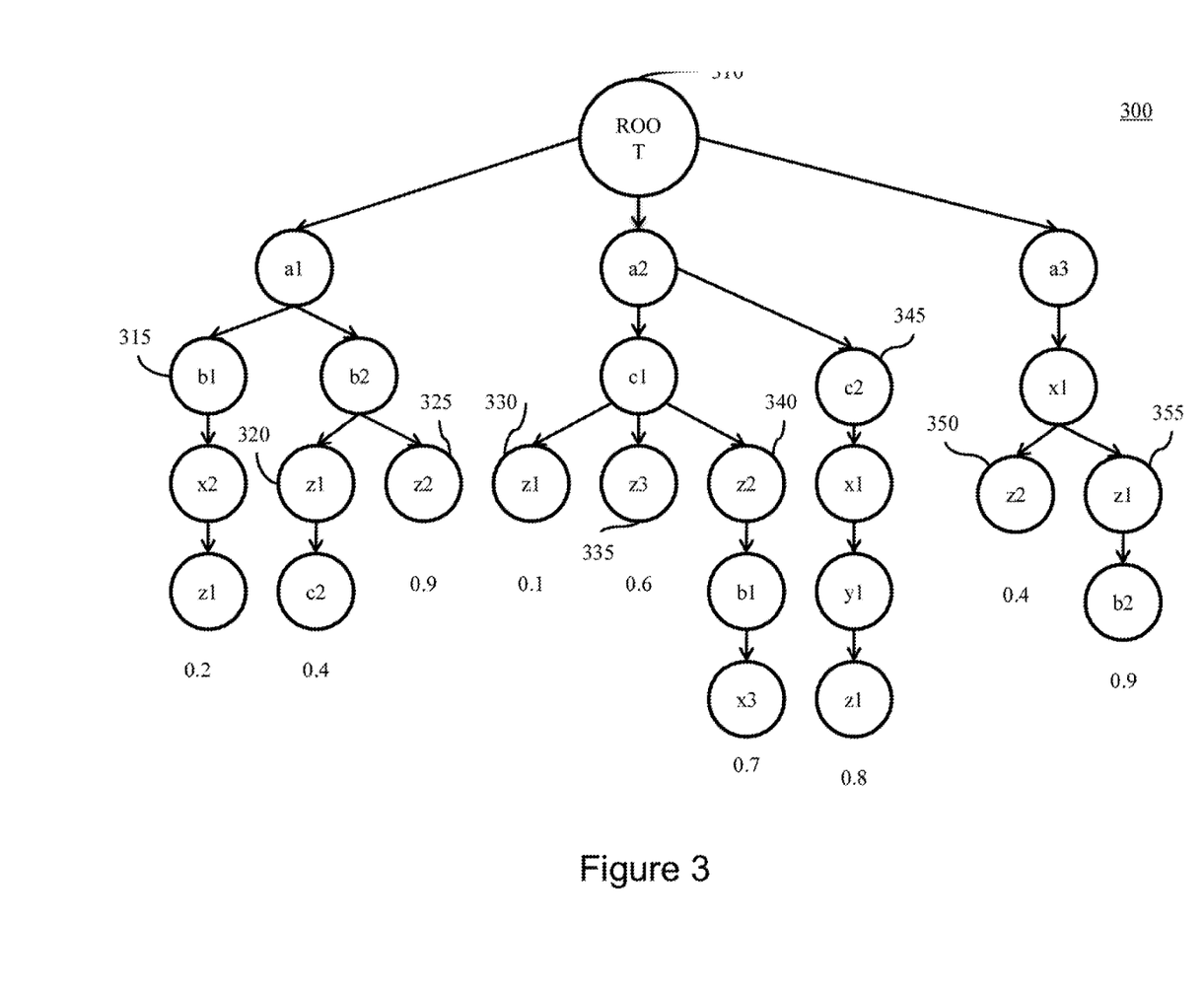
FIG. 3 illustrates a schematic diagram of the trie data structure, in accordance with embodiments of the present invention.

FIG. 3 illustrates a schematic diagram of the trie data structure 300. The trie data structure is used in various fields including, but not limited to advertisements, computational biology, data compression, data mining, information retrieval, natural language processing, network routing, pattern matching, text processing, and web applications.

The trie data structure 300 includes a root 310. The trie data structure 300 has different types of nodes. The different types of nodes are the one or more known value type nodes and the one or more unknown value type nodes. Each node of the trie data structure 300 has same type of child nodes. For example, the root 310 has known value type node A as its child node. For illustration, consider A, B, C, D, E as known value type nodes and V, W, X, Y, Z as unknown value type nodes. Each type of node can take different values. For example, A can take a1, a2, a3 and the like and B can take b1, b2, b3 and the like.

The trie data structure 300 includes one or more paths. Each path of the one or more paths has some value associated with it. As shown in FIG. 3, the trie data structure 300 includes a path 315 a1, b1, x2, z1 with a corresponding value 0.2, a path 320 a1, b2, z1, c2 with a corresponding value 0.4, a path 325 a1, b2, z2 with a corresponding value 0.9, a path 330 a2, c1, z1 with a corresponding value 0.1, a path 335 a2, c1, z3 with a corresponding value 0.6, a path 340 a2, c1, z2, b1, x3 with a corresponding value 0.7, a path 345 a2, c2, x1, y1, z1 with a corresponding value 0.8, a path 350 a3, x1, z2 with a corresponding value of 0.4, and a path 355 a3, x1, z1, b2 with a corresponding value of 0.9.

Figure 4A:
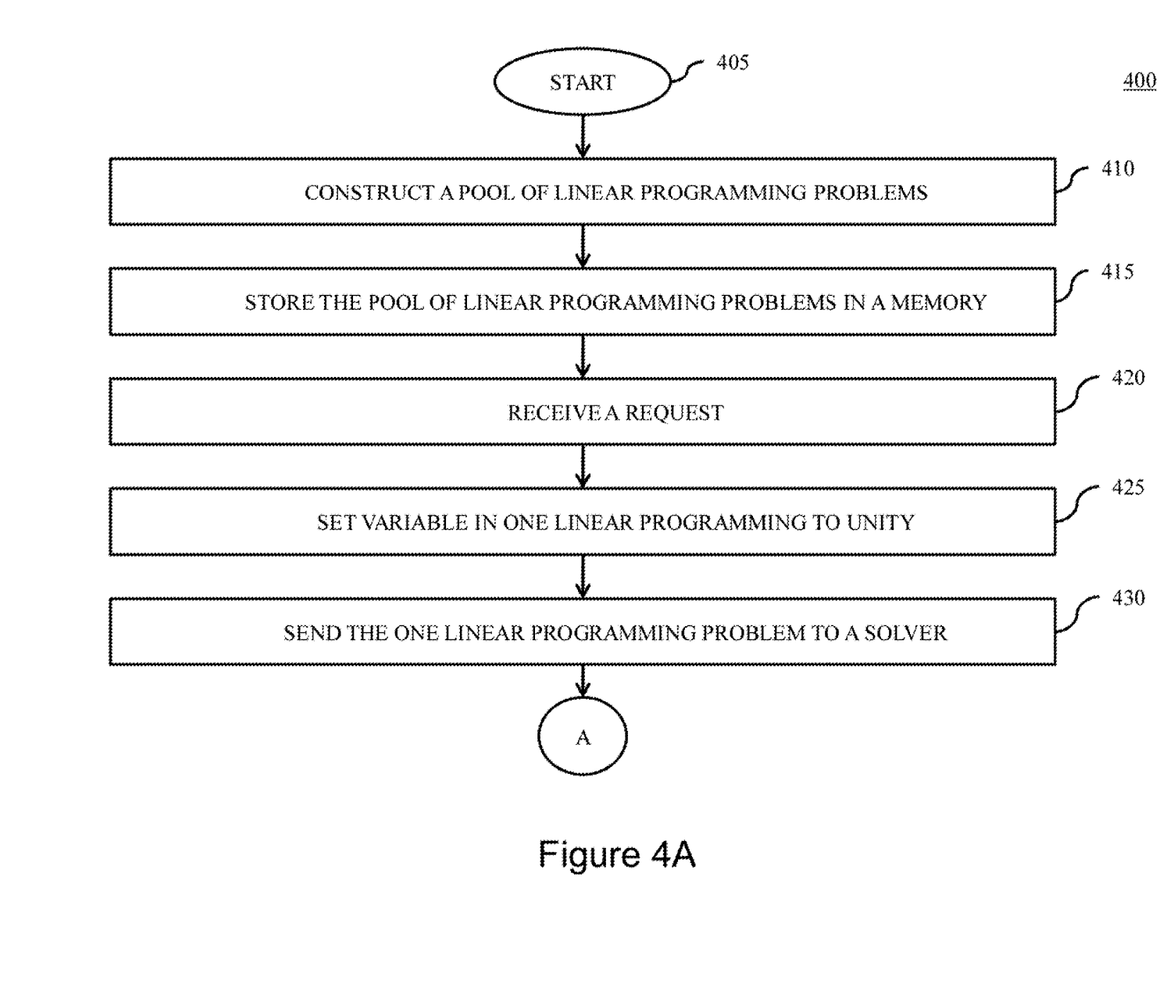
FIGS. 4A and 4B illustrate a flowchart for querying the trie data structure, in accordance with various embodiments of the present invention.
Figure 4B:
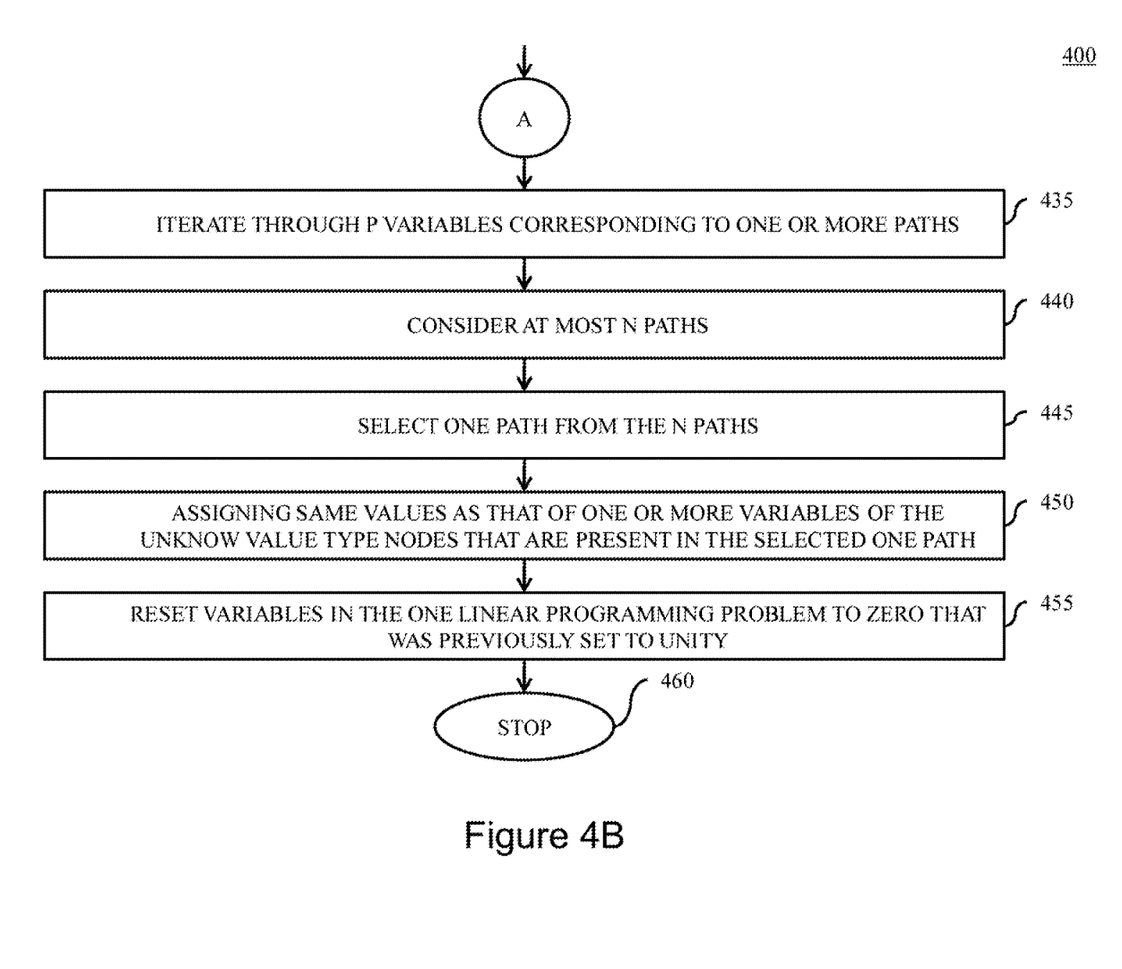

FIG. 4 illustrates a flowchart 400 for querying the trie data structure 300, in accordance with various embodiments of the present invention. At step 405, the flowchart 400 initiates. At step 410, the advertisement-serving platform 210 constructs the pool of linear programming problems for the trie data structure 300. The pool of linear programming problems includes similar type of linear programming problems. The trie data structure 300 includes one or more paths. The each path of the one or more paths includes one or more known value type nodes and one or more unknown value type nodes. Each path of the one or more paths is associated with a path value. The each linear programming problem of the pool of linear programming problems includes the objective function and the at least one constraint relationship. The one or more known value type nodes may represent various parameters such as the device type (for example, Android, iPhone), device location (for example, United States of America, Great Britain), device information (for example, IP address of the device), advertisement history of the device, device resolution, and the like. The one or more unknown value type nodes may represent various parameters such as ad template (for example, banner, image, text), advertiser (for example, Amazon, eBay) and the like. In an embodiment, the advertisement-serving platform 210 uses binary integer linear programming (BILP) to construct the pool of linear programming problems. In BILP, the variables in the each linear programming problem can only take values 0 or 1.

A step 415, the advertisement-serving platform 210 stores the pool of linear programming problems in the memory. The pool of linear programming problems for the trie data structure 300 is constructed at regular intervals.

At step 420, the advertisement-serving platform 210 receives the request from the user. The request includes the one or more values for the one or more known value type nodes. For example, the received request includes values for the known value type nodes A, B and C. The advertisement-serving platform 210 queries the trie data structure 300 to consider one or more paths that contain subset of the known value type nodes that are present in the request. For example, while querying the trie data structure 300 the advertisement-serving platform 210 know the values for the known value type nodes A=a2, B=b1 and C=c1. In this case, the path 330, the path 335 and the path 340 are eligible for consideration. The path 345 is not eligible because it contains c2 that is not present in the received request. The Objective of present invention is to come up with top n ctr value paths.

For illustration, consider an objective function minimize $$0.2*p1+0.4*p2+0.9*p3+0.1*p4+0.6*p5+0.7*p6+0.8*p7+0.4*p8+0.9*p9,$$

all paths constraint: p1+p2+p3+p4+p5+p6+p7+p8+p9=(no of paths-n)
where n=maximum paths the advertisement-serving platform 210 wants to get from the solver. In this case, the no of paths=9.
path having a path constraint, for example:
Path 315 having the path constraint $$a1+p1>=1$$

$$b1+p1>=1$$

Path 320 having the path constraint $$a1+p2>=1$$

$$b2+p2>=1$$

$$c2+p2>=1$$

Path 325 having the path constraint $$a1+p3>=1$$

$$b2+p3>=1 \text{ and the like}$$

The one linear programming problem is picked from the pool of linear programming problems. At step 425, the advertisement-serving platform 210 sets the one or variables in the one linear programming problem to unity. The variables correspond to the values received in the request. For example, the variables a2, b1 and c1 of the known value type nodes A, B and C are set to unity.

At step 430, the advertisement-serving platform 210 sends the one linear programming problem to the solver. The solver sets the p variable corresponding to each path of the one or more paths to 0 or 1. The solver is forced to set the p variable for a path to 1 which contains one or more known value type nodes that are not present in the request. For example, as c2 variable is 0 in the path 345, hence the solver sets p7 to 1 by the corresponding path constraint c2+p7>=1. The p1 variable corresponds to the path 315, p2 variable corresponds to the path 320, p3 variable corresponds to the path 325 and the like. Further, the solver considers the variables corresponding to each known value type node present in the received request as constants.

As considered in the illustration the all paths constraint directs the solver to set p variable value to 0 whose path value is highest. As in the objective function considered for illustration, each p variable corresponding to each path is multiplied with the corresponding CTR (Click-Through Rate) value to obtain a minimized result, the path whose p variable is set to 0 is considered. In an embodiment, when multiple paths contain values for the known value type nodes that are received in the request, the solver will try to set p variable value corresponding to the path having maximum path value to 0 as that will be an optimal solution to the minimization objective. In this example the path 330, the path 335, and the path 340 are eligible but the path 340 has more path value so corresponding p variable value i.e., p6 will be set to 0. For example, if n=1 then only p6 will be set to 0 by the solver. But, if n=2 then p5 and p6 both will be set to 0 by the solver. If n=3 or more only p4,p5 and p6 will be set to 0 by the solver as only the path 330, the path 335 and the path 340 are eligible paths for the given example. So n is number of at most p variables that are set to 0.

At step 435, the advertisement-serving platform 210 iterates through p variables corresponding to one or more paths. At step 440, the advertisement-serving platform 210 considers at most n paths. The at most n paths are considered whose value of the p variable is set to 0.

At step 445, the advertisement-serving platform 210 selects one path from the at most n paths. The selection is based on the weighted random method.

At step 450, the advertisement-serving platform 210 assigns same values as that of one or more variables of the unknown value type nodes that are present in the selected one path. Further, the advertisement-serving platform 210 assigns random values to the one or more variables of the unknown value type nodes that are not present in the selected one path. For example, let the path 340 be the selected one path a2, c1, z2, b1, x3. Here, the selected one path 340 contains values for unknown value type nodes Z and X but Y. Hence, the advertisement-serving platform 210 assigns z2 to Z and x3 to x. Also, the advertisement-serving platform 210 assigns a random value to the unknown value type node Y, as it is not present in the selected one path 340.

Consider for illustration, the known value type nodes A corresponds to country. B corresponds to mobile OS (Operating System) and C corresponds to pin code and the unknown value type node Z corresponds to ad template, X corresponds to advertiser and Y corresponds to tag cluster. If the received request is from IN, IOS, 440022 and the selected path is IN, 440022, BANNER TEMPLATE, IOS, AMAZON. Then, the advertisement-serving platform 210 selects banner template and serves the ad from Amazon. Since, the selected path 340 does not include the unknown value type node Y the advertisement-serving platform 210 selects a random value i.e., any tag cluster.

A step 455, the advertisement-serving platform 210 resets variables in the one linear programming problem to zero that was previously set to unity. The one linear programming problem is put back into the pool of linear programming problems. For example, the variables corresponding to a1 and b1 of the known value type nodes A and B are set to zero which was previously set to unity at step 425 and put back into the pool of linear programming problems to serve the next request received from the user. At step 460, the flowchart 400 terminates.

The advantage of the present invention is that, by querying nodes of the trie data structure 300 using BILP reduces the latency period and the advertisement transversal time. Further, using this method, the sampling procedure which is present in the prior art is completely eliminated. The invention is not limited to prediction of the click-through rates of the advertisements. For example, the invention can be used for querying a wireless protocol node, querying a node in a computer system and the like.

It should be understood that the foregoing pertains only to the exemplary embodiments of the present invention, and that numerous changes may be made to the embodiments described herein without departing from the spirit and scope of the invention.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer implemented method for processing data stored in a trie data structure, the method comprising:
    a. constructing a pool of linear programming problems for a trie data structure, wherein the pool of linear programming problems for the trie data structure is constructed at regular intervals, wherein the pool comprises similar linear programming problems, wherein the trie data structure comprises one or more paths, wherein each path of the one or more paths comprises three or more known value type nodes and two or more unknown value type nodes, wherein each path has a path value, wherein at least three of the known value types correspond to a location, an operating system, and a device identifier and at least two of the unknown value type nodes respectively correspond to an ad template and an advertiser;
    b. storing the pool of linear programming problems in a memory;
    c. receiving a request, wherein the request comprises one or more values for the one or more known value type nodes;
    d. setting variables in one linear programming problem to unity, wherein the one linear programming problem is picked from the pool of linear programming problems, wherein the variables correspond to one or more values received in the request;
    e. sending the one linear programming problem to a solver, wherein the solver sets a p variable corresponding to each path to 0 or 1, wherein the solver considers the variables corresponding to each known value type node as constants;
    f. iterating through p variables corresponding to the one or more paths;
    g. considering at most n paths, wherein a value of the p variable is set to 0 in the considered at most n paths;
    h. selecting one path from the n paths, wherein selecting is based on the weighted random method;
    i. assigning same values as that of one or more variables of the unknown value type nodes, wherein the one or more variables of the unknown value type nodes are present in the selected one path to select at least a location, an operating system, a device identifier, and an ad, and an advertiser corresponding to the one or more values in the request;
    j. serving the ad from the advertiser to the device corresponding to the device identifier for an operating system of the device at the location of the device; and
    k. resetting variables in the one linear programming problem to zero that was previously set to unity, wherein the one linear programming problem is put back into the pool of linear programming problems.

2. The computer implemented method as claimed in claim 1, wherein the computer implemented method further comprises assigning random values to one or more variables of the unknown value type nodes, wherein the one or more variables of the unknown value type nodes are not present in the selected one path.

3. The computer implemented method as claimed in claim 1, wherein each linear programming problem of the pool of linear programming problems comprises an objective function and at east one constraint relationship.

4. The computer implemented method as claimed in claim 1, wherein the solver sets the p variable to 0 or 1 based on the objective function and the at least one constraint relationship.

5. A system for processing data stored in a trie data structure, the system comprising:
    a processor; and
    a memory comprising code stored therein and executable by the processor, wherein the code includes:
    a. a building module, wherein the construction module is configured to construct a pool of linear programming problems for a trie data structure, wherein the pool comprises similar linear programming problems, wherein the trie data structure comprises one or more paths, wherein each path of the one or more paths comprises one or more known value type nodes and one or more unknown value type nodes, wherein each path has a path value;
    b. a storage module, wherein the storage module is configured to store the pool of linear programming problems in a memory;
    c. a receiving module, wherein the receiving module is configured to receive a request, wherein the request comprises one or more values for the one or more known value type nodes;
    d. a configuration module, wherein the configuration module is configured to set variables in one linear programming problem to unity, wherein the one linear programming problem is picked from the pool of linear programming problems, wherein the variables correspond to one or more values received in the request;
    e. a transmitting module, wherein the transmitting module is configured to send the one linear programming problem to a solver, wherein the solver sets a p variable corresponding to each path to 0 or 1, wherein the solver considers the variables corresponding to each known value type node as constants;
    f. an iteration module, wherein the iteration module is configured to iterate through p variables corresponding to one or more paths;
    g. an identification module, wherein the identification module is configured to consider at most n paths, wherein value of the p variable is set to 0 in the considered at most n paths;
    h. a selection module, wherein the selection module is configured to select one path from the n paths;
    l. an assignment module, wherein the assignment module is configured to assign same values as that of one or more variables of the unknown value type nodes, wherein the one or more variables of the unknown value type nodes are present in the selected one path to select at least a location, an operating system, a device identifier, and an ad, and an advertiser corresponding to the one or more values in the request;

m. a serving module, wherein the serving module is configured to serve the ad from the advertiser to the device corresponding to the device identifier for an operating system of the device at the location of the device; and
i. a resetting module, wherein the resetting module is configured to reset the variables in the one linear programming problem to zero.

6. The system as claimed in claim 5, wherein the construction module constructs the pool of linear programming problems for the trie data structure at regular intervals.

7. The system as claimed in claim 5, wherein the selection module selects one path from the n paths based on the weighted random method.

8. The system as claimed in claim 5, wherein the assignment module assigns same values to the one or more variables of the unknown value type nodes that are present in the selected one path.

9. The system as claimed in claim 5, wherein the assignment module assigns random values to the one or more variables of the unknown value type nodes that are not present in the selected one path.

10. The system as claimed in claim 5, wherein the resetting module resets the variables in the one linear programming problem to zero that was previously set to unity.

11. The system as claimed in claim 10, wherein the resetting module puts back the one linear programming problem into the pool of linear programming problems.

12. The system as claimed in claim 5, wherein the assignment module assigns random values to one or more variables of the unknown value type nodes, wherein the one or more variables of the unknown value type nodes are not present in the selected one path.

13. A non-transitory, computer program product comprising code stored therein and executable by the processor, wherein the code includes:
  a. a building module, wherein the construction module is configured to construct a pool of linear programming problems for a trie data structure, wherein the pool comprises similar linear programming problems, wherein the trie data structure comprises one or more paths, wherein each path of the one or more paths comprises one or more known value type nodes and one or more unknown value type nodes, wherein each path has a path value;
  b. a storage module, wherein the storage module is configured to store the pool of linear programming problems in a memory;
  c. a receiving module, wherein the receiving module is configured to receive a request, wherein the request comprises one or more values for the one or more known value type nodes;
  d. a configuration module, wherein the configuration module is configured to set variables in one linear programming problem to unity, wherein the one linear programming problem is picked from the pool of linear programming problems, wherein the variables correspond to one or more values received in the request;
  e. a transmitting module, wherein the transmitting module is configured to send the one linear programming problem to a solver, wherein the solver sets a p variable corresponding to each path to 0 or 1, wherein the solver considers the variables corresponding to each known value type node as constants;
  f. an iteration module, wherein the iteration module is configured to iterate through p variables corresponding to one or more paths;
  g. an identification module, wherein the identification module is configured to consider at most n paths, wherein value of the p variable is set to 0 in the considered at most n paths;
  h. a selection module, wherein the selection module is configured to select one path from the n paths;
  n. an assignment module, wherein the assignment module is configured to assign same values as that of one or more variables of the unknown value type nodes, wherein the one or more variables of the unknown value type nodes are present in the selected one path to select at least a location, an operating system, a device identifier, and an ad, and an advertiser corresponding to the one or more values in the request;
  o. a serving module, wherein the serving module is configured to serve the ad from the advertiser to the device corresponding to the device identifier for an operating system of the device at the location of the device; and
  i. a resetting module, wherein the resetting module is configured to reset the variables in the one linear programming problem to zero.

14. The non-transitory, computer program product in claim 13, wherein the construction module constructs the pool of linear programming problems for the trie data structure at regular intervals.

15. The non-transitory, computer program product claim 13, wherein the selection module selects one path from the n paths based on the weighted random method.

16. The non-transitory, computer program product in claim 13, wherein the assignment module assigns same values to the one or more variables of the unknown value type nodes that are present in the selected one path.

17. The non-transitory, computer program product in claim 13, wherein the assignment module assigns random values to the one or more variables of the unknown value type nodes that are not present in the selected one path.

18. The non-transitory, computer program product in claim 13, wherein the resetting module resets the variables in the one linear programming problem to zero that was previously set to unity.

19. The non-transitory, computer program product in claim 18, wherein the resetting module puts back the one linear programming problem into the pool of linear programming problems.

20. The non-transitory, computer program product in claim 13, wherein the assignment module assigns random values to one or more variables of the unknown value type nodes, wherein the one or more variables of the unknown value type nodes are not present in the selected one path.

* * * * *